US008280401B2

(12) United States Patent
Na et al.

(10) Patent No.: US 8,280,401 B2
(45) Date of Patent: Oct. 2, 2012

(54) METHOD OF MANAGING PAGING GROUP

(75) Inventors: Jee Hyeon Na, Daejeon (KR); Sang Ho Lee, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 308 days.

(21) Appl. No.: 12/676,455

(22) PCT Filed: Aug. 25, 2008

(86) PCT No.: PCT/KR2008/004962
§ 371 (c)(1),
(2), (4) Date: Mar. 4, 2010

(87) PCT Pub. No.: WO2009/031775
PCT Pub. Date: Mar. 12, 2009

(65) Prior Publication Data
US 2010/0210284 A1      Aug. 19, 2010

(30) Foreign Application Priority Data

Sep. 6, 2007    (KR) .................. 10-2007-0090434

(51) Int. Cl.
*H04W 64/00*    (2009.01)
*H04W 68/00*    (2009.01)
(52) U.S. Cl. .................................... 455/456.1; 455/458
(58) Field of Classification Search .................. 455/458, 455/466, 423, 435.1, 422.1, 437, 574, 421, 455/456.1–456.6, 440, 432.1–434, 517, 553.1, 455/562.1, 439; 370/311, 331–335, 328, 370/338, 347
See application file for complete search history.

(56) References Cited

U.S. PATENT DOCUMENTS

| 6,393,285 | B1 |   | 5/2002 | Stephens |            |
|-----------|----|---|--------|----------|------------|
| 7,787,892 | B2 | * | 8/2010 | Yang et al. | 455/458  |
| 7,917,157 | B2 | * | 3/2011 | Muhonen  | 455/456.2  |
| 8,112,083 | B1 | * | 2/2012 | Sigg et al. | 455/435.1 |

(Continued)

FOREIGN PATENT DOCUMENTS

KR    10-2007-0007521 A    1/2007

(Continued)

OTHER PUBLICATIONS

Shun-Ren Yang et al., Performance Evaluation of Location Management in UMTS, IEEE Transactions on Vehicular Technology, Nov. 2003, vol. 52, No. 6.

*Primary Examiner* — Melody Mehrpour
(74) *Attorney, Agent, or Firm* — Jefferson IP Law, LLP

(57) ABSTRACT

The present invention relates to a method of managing a paging group in a mobile terminal that is in an idle mode. A method of managing a paging group according to an exemplary embodiment of the invention includes: collecting paging group ID information including paging group levels and local IDs; determining, on the basis of the collected paging group ID information, whether or not a location update occurs; and if it is determined that the location update occurs, comparing a location update cycle according to a location update time with a threshold value, selecting a paging group level on the basis of the comparison result, and selecting a paging group corresponding to the selected paging group level.

13 Claims, 5 Drawing Sheets

| U.S. PATENT DOCUMENTS | | | |
|---|---|---|---|
| 8,195,122 B1 * | 6/2012 | Kahn et al. | 455/404.2 |
| 2006/0089161 A1 * | 4/2006 | Kim et al. | 455/458 |
| 2007/0082683 A1 | 4/2007 | Na et al. | |
| 2007/0218926 A1 * | 9/2007 | Zhuang et al. | 455/466 |
| 2010/0035633 A1 * | 2/2010 | Park et al. | 455/456.1 |

FOREIGN PATENT DOCUMENTS

| KR | 10-2007-0008963 A | 1/2007 |
|---|---|---|
| KR | 10-0736729 B1 | 7/2007 |
| WO | 2006/011775 A2 | 2/2006 |
| WO | 2006/138573 A2 | 12/2006 |

* cited by examiner

[Fig. 1]
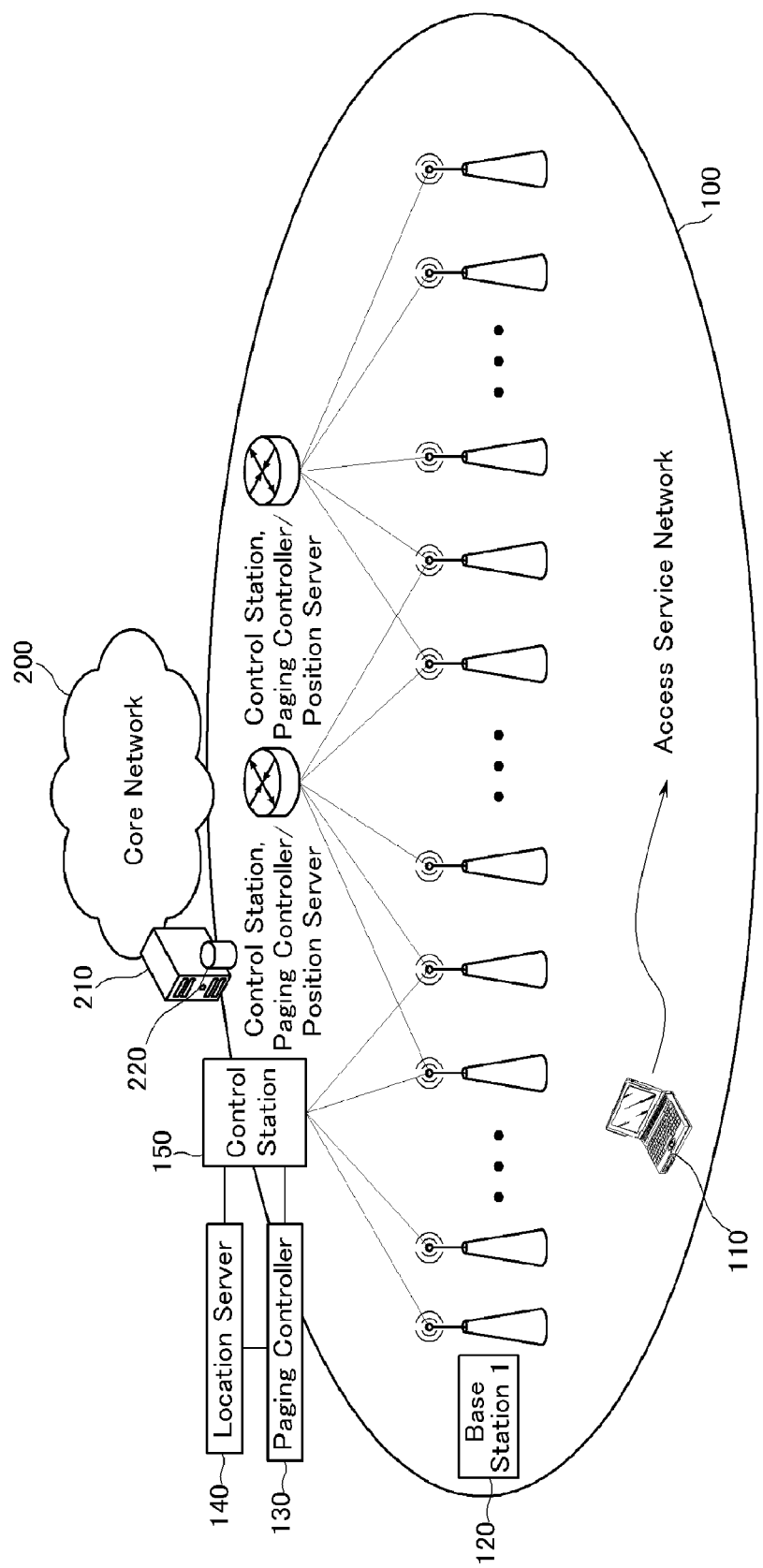

[Fig. 2]

| Paging group level | 1 bit | 2 bit | 3 bit | 4 bit | 5 bit | 6 bit | 7 bit | 8 bit | 9 bit | 10 bit | 11 bit | 12 bit | 13 bit | 14 bit | 15 bit |
|---|---|---|---|---|---|---|---|---|---|---|---|---|---|---|---|
| 0 bit | | | | | | | | Local ID | | | | | | | |

201 — Paging group level
202 — Local ID

[Fig. 3]
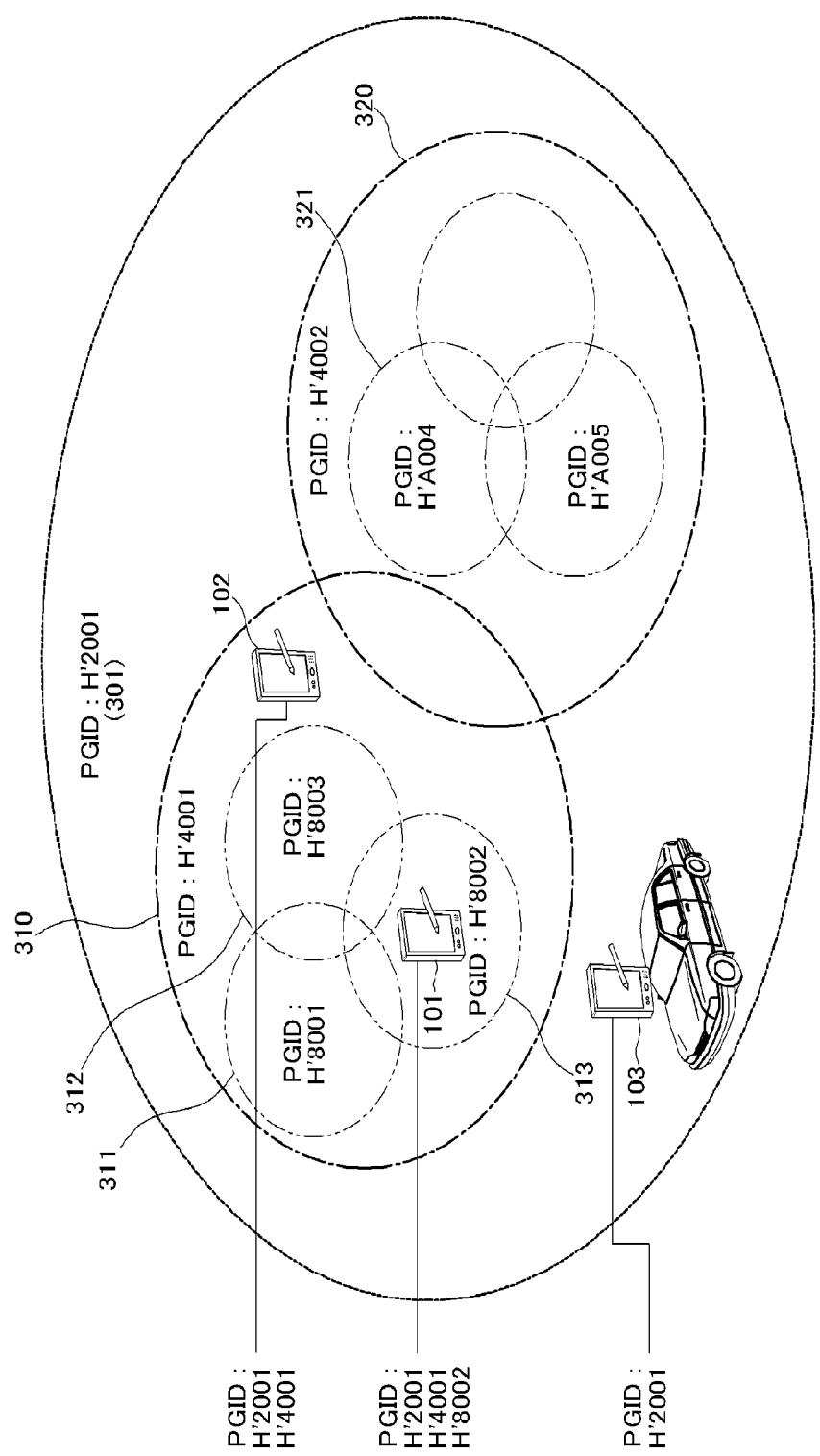

[Fig. 4]
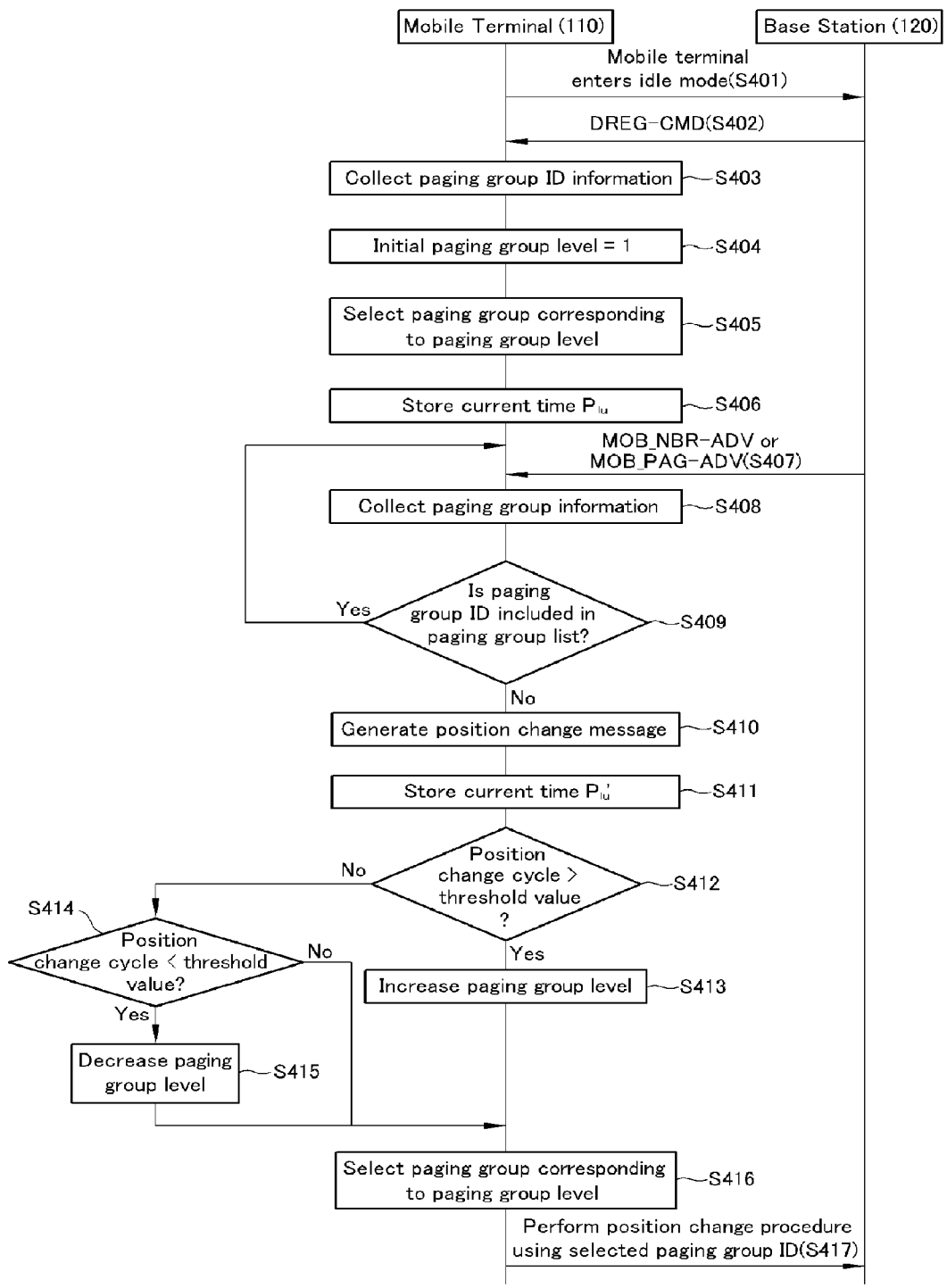

[Fig. 5]
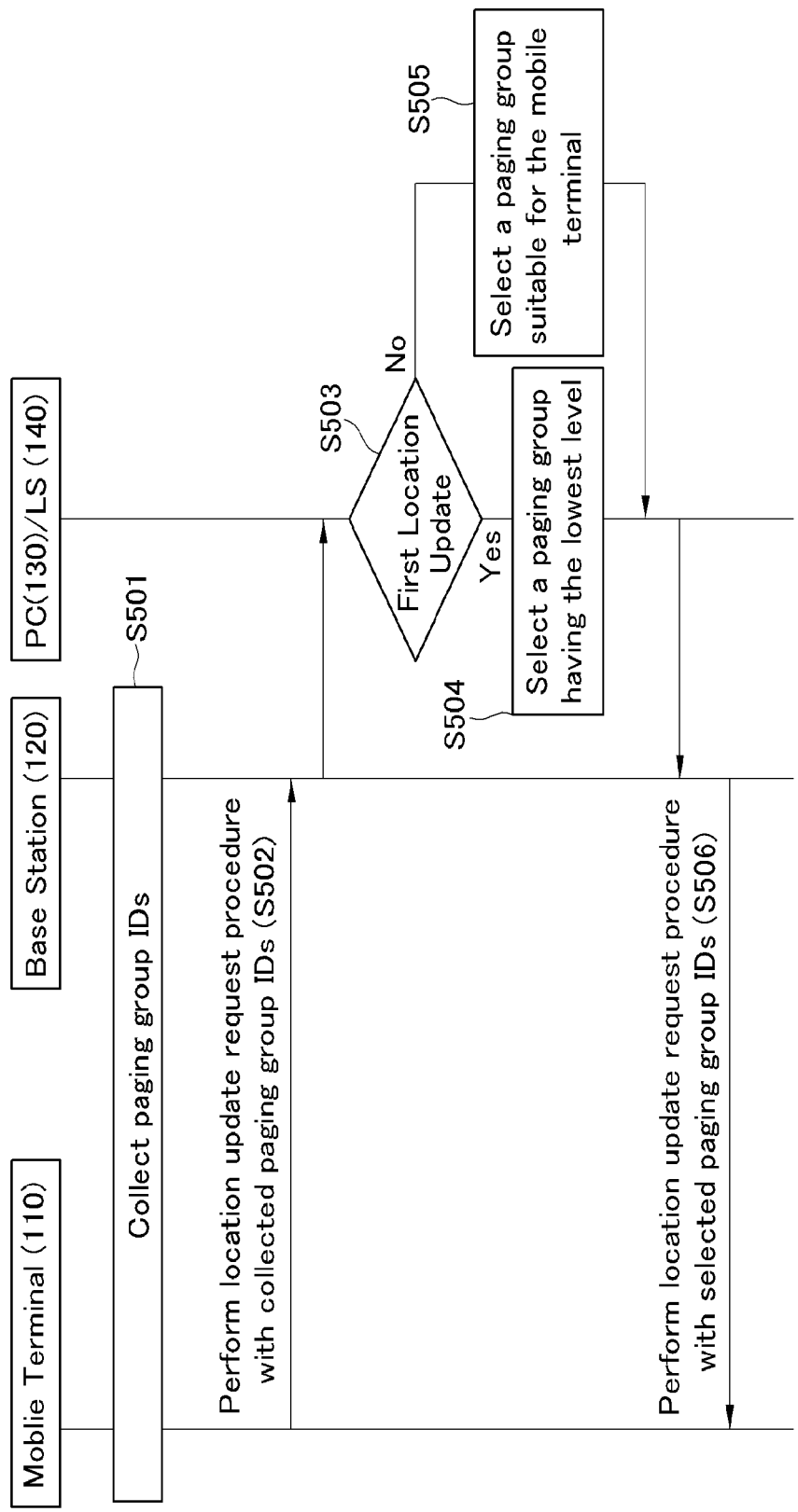

METHOD OF MANAGING PAGING GROUP

TECHNICAL FIELD

The present invention relates to a method of managing a paging group. In particular, the present invention relates to a method of managing a paging group for a mobile terminal in an idle mode.

BACKGROUND ART

In a mobile communication system, particularly in an IEEE 802.16e-based communication system, a mobile terminal that does not use a service for a predetermined time is managed in an idle mode so as to realize power saving.

In the idle mode, paging groups are defined such that resource release and paging can be performed, but a method of managing a paging group has not yet been defined.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method of managing a paging group for a mobile terminal while taking a user speed into consideration. In addition, the present invention has been made in an effort to provide a method of managing a paging group for a mobile terminal in an idle mode, having an advantage of reducing an overhead when a location update occurs.

Technical Solution

An exemplary embodiment of the present invention provides a method of managing a paging group for a mobile terminal in an idle mode. The method includes collecting paging group ID information including paging group levels and local IDs, determining, on the basis of the collected paging group ID information, whether or not a location update occurs, if it is determined that the location update occurs, comparing a location update cycle according to a location update time with a threshold value, selecting a paging group level on the basis of the comparison result, and selecting a paging group corresponding to the selected paging group level.

Another embodiment of the present invention provides a method of managing a paging group for a mobile terminal in an idle mode. The method includes collecting paging group ID information including paging group levels and local IDs, selecting a paging group level corresponding to a movement speed of the mobile terminal among the paging group levels, and selecting a paging group corresponding to the selected paging group level.

Still another embodiment of the present invention provides a method of managing a paging group. The method includes being provided with collecting paging group ID information including paging group levels and local IDs from a mobile terminal; selecting a paging group level corresponding to a movement speed of the mobile terminal among the paging group levels; selecting a paging group corresponding to the selected paging group level; and transmitting information on the selected paging group to the mobile terminal.

Advantageous Effects

According to the embodiments of the present invention, there is provided a method of managing a paging group for a mobile terminal in an idle mode that can be easily applied when a user speed changes, while taking the user speed into consideration.

BRIEF DESCRIPTION OF THE DRAWINGS

FIG. 1 is a diagram showing the structure of a communication network according to an exemplary embodiment of the present invention.

FIG. 2 is a diagram showing the structure of a paging group ID according to an exemplary embodiment of the present invention.

FIG. 3 is a diagram showing the structure of a network using a paging group ID according to an exemplary embodiment of the present invention.

FIG. 4 is a flowchart illustrating a method of managing a paging group for a mobile terminal not having an IP address according to an exemplary embodiment of the present invention.

FIG. 5 is a flowchart illustrating a method of managing a paging group according to another exemplary embodiment of the present invention.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

In this specification, a mobile terminal (MT) may refer to a terminal, a mobile station (MS), a subscriber station (SS), a portable subscriber station (PSS), a user equipment (UE), or an access terminal (AT). The mobile terminal may include all or part of the functions of the mobile station, the subscriber station, and the portable subscriber station, and the user equipment.

In this specification, a base station (BS) may refer to an access point (AP), a radio access station (RAS), a node B, a base transceiver station (BTS), or an MMR (Mobile Multihop Relay)-BS. The base station may include all or part of the functions of the access point, the radio access station, the node B, the base transceiver station, and the MMR-BS.

A method of managing a paging group according to an exemplary embodiment of the present invention will now be described in detail with reference to the accompanying drawings.

FIG. 1 is a diagram showing the structure of a communication network according to an exemplary embodiment of the present invention.

As shown in FIG. 1, the communication network according to the exemplary embodiment of the present invention includes an access service network 100 and a core network 200. Hereinafter, it is assumed that the communication network is an IEEE 802.16e-based mobile WiMAX (World Interoperability for Microwave Access) network.

The access service network 100 includes a mobile terminal 110, base stations 120, each of which has a paging function for the mobile terminal 110, a paging controller 130 that controls the paging function for the mobile terminal 110, a location server 140 that manages positional information, and a control station 150 that has an interface between the paging controller 130 and the location server 140. The location server 140 may be also called LS, and the paging controller 130 may be also called PC.

The mobile terminal 110 is a communication apparatus that can access the communication network through a radio channel.

The base stations 120 perform wireless communication with the mobile terminal 110 through the radio channel. The plurality of base stations are grouped to form a single paging group. A spatial area that is managed by the paging group is referred to as a paging area.

The paging controller 130 supports an idle mode of the mobile terminal 110. In addition, the paging controller 130 manages the status and location of the mobile terminal 110 and controls the paging area in connection with the location server 140.

The location server 140 stores/manages information on the mobile terminal 110, including an MAC (Media Access Control) address corresponding to the physical address of the mobile terminal 110 or an IP (Internet Protocol) address corresponding to a network address.

The control station 150 serves as a base station controller to control the plurality of base stations 100, and is connected to the paging controller 130.

As shown in FIG. 1, the paging controller 130/the location server 140 and the control station 150 may be constructed by a single physical platform or may be separately constructed.

The core network 200 includes a location server 210 that manages positional information, and a paging controller 220.

In the exemplary embodiment of the present invention, a case where the paging controller 130/the location server 140 and the control station 150 are constructed by separate platforms will be described. The paging controller/the location server are hierarchically positioned so as to efficiently manage the paging groups.

Next, the structure of a paging group ID in a mobile WiMAX network according to the exemplary embodiment of the present invention, while taking a user movement speed into consideration, will be described in detail with reference to FIG. 2.

FIG. 2 is a diagram showing the structure of a paging group ID according to an exemplary embodiment of the present invention.

In the IEEE 802.16e-based mobile WiMAX network structure, the paging group ID (PGID) is defined by 16 bits. The paging group ID according to the exemplary embodiment of the present invention includes a paging group level (PG Level) 201 and a local ID 202.

The paging group level 201 means the level of the paging group and paging group information is represented by the 0-th to second bits among the 16 bits of the paging group ID.

First, the 0-th bit is to identify whether or not the paging area is a small area. Specifically, when the paging group is allocated to a small group, the 0-th bit is set to '1'. In addition, when the paging group is allocated to a medium group or a large group, the 0-th bit is set to '0'.

When the 0-th bit is '0', the first bit is used so as to identify whether or not the paging area is a medium area. When the paging group is allocated to the medium group, the first bit is set to '1'. In addition, when the paging group is allocated to the large group, the first bit is set to '0'.

When the 0-th and first bits are all '0', the second bit is used so as to identify whether or not the paging area is the large area. When the paging group is allocated to the large group, the second bit is set to '1'. In addition, when each network layer level is not used, the second bit is set to '0'.

The local ID 202 is used as the paging group ID for each network layer level, and is defined by the third to 15-th bits among the 16 bits of the paging group ID.

Next, the structure of a network using a paging group ID according to an exemplary embodiment of the present invention will be described with reference to FIG. 3.

FIG. 3 is a diagram showing the structure of a network using a paging group ID according to an exemplary embodiment of the present invention.

Referring to FIG. 3, an H'4001 medium group 310 and an H'4002 medium group 320 exist in an H'2001 large group 300. In addition, in the H'4001 medium group 310, an H'8001 small group 311, an H'8002 small group 312, and an H'8003 small group 313 exist, and in the H'4002 medium group 320, an H'A004 small group 321, an H'A005 small group, and the like exist.

Therefore, according to the exemplary embodiment of the present invention, according to the position, the mobile terminal 110 may belong to a small group, and a medium group and a large group including the small group, to a medium group and a large group including the medium group, or to a large group.

For example, referring to FIG. 3, the mobile terminal 101 belongs to the H'8002 small group 312, the H'4001 medium group 310, and the H'2001 large group 300. In addition, the mobile terminal 102 belongs to the H'4001 medium group 310 and the H'2001 large group 300.

As shown in FIG. 3, the paging group ID (PGID) is represented in hexadecimal. For example, the paging group ID (PGID) of the H'8001 small group 311 is '8' in hexadecimal of H'8001, which is represented in binary as '1000'. In this case, as illustrated in FIG. 2, since the 0-th bit is '1', it is determined that the group is the small group.

The paging group ID (PGID) of the H'4001 medium group 310 is '4' in hexadecimal of H'4001, which is represented in binary as '0100'. In this case, since the 0-th bit is 0 and the first bit is 1, it is determined that the group is the medium group. Furthermore, the paging group ID (PGID) of the H'2001 large group 300 is '2' in hexadecimal of H'2001, which is represented in binary as '0010'. In this case, since the 0-th bit is 0, the first bit is 0, and the second bit is 1, it is determined that the group is the large group.

Next, a method that selects a paging group according to the speed of the mobile terminal 110 in a paging area and manages a paging group will be described with reference to FIG. 4.

FIG. 4 is a flowchart illustrating a method of managing a paging group for a mobile terminal 110 not having an IP address according to an exemplary embodiment of the present invention.

As shown in FIG. 4, if the mobile terminal 110 enters the idle mode (Step S401), the base station 120 transmits a de-registration command (DREG-CMD) message to the mobile terminal 110 (Step S402).

The mobile terminal 110 collects paging group ID (PGID) information (Step S403). First, an initial paging group level is set to '1' (Step S404), and a paging group corresponding to the initial paging group level is selected from a paging group list in the mobile terminal 110 (Step S405). If a paging group corresponding to the initial paging group level does not exist, a paging group having the lowest level is selected, and the initial paging group is changed to a paging group having the lowest paging group level in the paging group list.

The mobile terminal 110 stores a current time $P_{lu}$ at the same time the paging group is selected (Step S406).

The mobile terminal 110 receives a neighboring base station advertisement (MOB_NBR_ADV) message and a paging advertisement (MOB_PAG-ADV) message corresponding to a paging message from the base station 120 (Step S407), and collects paging group ID (PGID) information on a paging group to which the mobile terminal 110 belongs (Step S408). It is determined whether or not the paging group ID (PGID) collected at Step S408 is included in the paging group list (Step S409).

If it is determined at Step S409 that the paging group ID (PGID) is included in the paging group list, Steps S407 to S410 are repeatedly performed.

Meanwhile, if the paging group ID (PGID) is not included in the paging group list, a location update message by the paging group is generated (Step S410).

In correspondence with the location update message at Step S410, a changed current time $P_{lu}'$ is stored (Step S411). The mobile terminal 110 compares a location update cycle, which is a difference between the current time $P_{lu}'$ stored at Step S411 and the current time $P_{lu}$ stored at Step S406, with a threshold value $T_{hlu}$ (Step S412). Here, the threshold value $T_{hlu}$ may be set and changed for every mobile terminal 110.

If it is determined at Step S412 that the location update cycle is larger than the threshold value $T_{hlu}$, the speed of the mobile terminal 110 is determined to be high, and the paging group level (PG Level) is increased (Step S413). Then, the mobile terminal 110 selects a paging group corresponding to the increased paging group level at Step S413 (Step S416). Meanwhile, if it is determined at Step S413 that the paging group level (PG Level) is the highest paging group level, the increasing of the paging group level is stopped.

If it is determined at Step S412 that the location update cycle is smaller than the threshold value $T_{hlu}$, the paging group level (PG Level) is decreased, and the location update cycle is decreased (Step S415). Then, the mobile terminal 110 selects a paging group corresponding to the decreased paging group level at Step S415 (Step S416). Meanwhile, if it is determined at Step S415 that the paging group level (PG Level) is the lowest paging group level, the decreasing of the paging group level is stopped.

The mobile terminal 110 performs a location update procedure according to the paging group selected at Step S416 (Step S417).

FIG. 5 is a flowchart illustrating a method of managing a paging group according to another exemplary embodiment of the present invention.

Here, a mobile terminal 110 manages paging groups connected with the location server 140.

Referring FIG. 5, the mobile terminal 110 collects paging group IDs through the base station 120 by performing the steps (S401-S403), as the above described (Step 501). Then, the mobile terminal 110 transmits a list including the collected paging group IDs to the location server 140 via base station 120 (Step 502).

The location server 140 determines whether a first location update occurs (Step 503). When the first location update occurs, the location server 140 selects at least one paging group having the lowest level by performing the steps (S404-S406), as the above described (Step 504).

However, when the first location update dose not occur, the location server 140 selects at least one paging group that is suitable for the mobile station 110 by performing the steps (S408-S4016), as the above described (Step 505).

After selecting the paging group, the location server 140 transmits a location update response message including the selected paging group IDs (Step 506). The location update response message is provided to the mobile terminal via base station 120.

Therefore, the mobile station 110 performs a location update procedure according to the selected group provided through location update response message.

The embodiment of the present invention described above is not implemented by only the method and apparatus, but it may be implemented by a program for executing the functions corresponding to the configuration of the exemplary embodiment of the present invention or a recording medium having the program recorded thereon. These implementations can be realized by the ordinary skilled person in the art from the description of the above-described exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of managing a paging group for a mobile terminal in an idle mode, the method comprising:
    collecting paging group ID information including paging group levels and local IDs;
    determining, on the basis of the collected paging group ID information, whether or not a location update occurs;
    comparing a location update cycle according to a location update time with a threshold value if it is determined that the location update occurs;
    selecting a paging group level on the basis of the comparison result; and
    selecting a paging group corresponding to the selected paging group level.

2. The method of claim 1, further comprising:
    collecting initial paging group ID information when the mobile terminal enters the idle mode;
    setting an initial paging group level to a paging group level representing a minimum area; and
    selecting a paging group corresponding to the minimum area from the initial paging group ID information on the basis of the initial paging group level.

3. The method of claim 1, wherein the position change cycle is a difference between the location update time and a time immediately before the location update occurs.

4. The method of claim 1, further comprising,
    increasing the paging group level to a value representing a paging group having a large area when the location update cycle is larger than the threshold value.

5. The method of claim 1, further comprising,
    decreasing the paging group level to a value representing a paging group having a small area when the location update cycle is smaller than the threshold value.

6. A method of managing a paging group for a mobile terminal in an idle mode, the method comprising:
    collecting paging group ID information including paging group levels and local IDs;

selecting a paging group level corresponding to a movement speed of the mobile terminal among the paging group levels; and selecting a paging group level corresponding to a movement speed of the mobile terminal among the paging group levels; and selecting a paging group corresponding to the selected paging group level.

7. The method of claim 6, further comprising,
when at least three bits of the paging group ID information represent the paging group level, determining the paging group corresponding to the paging group level using the at least three bits.

8. The method of claim 6, wherein the at least three bits include:
a first bit that represents whether or not the paging group is a first group;
a second bit that represents whether or not the paging group is a second group, which is larger than the first group; and
a third bit that represents whether or not the paging group is a third group, which is larger than the second group.

9. The method of claim 6, further comprising:
increasing the paging group level when the movement speed of the mobile terminal is high; and
decreasing the paging group level when the movement speed is low.

10. The method of claim 9, wherein:
the increasing of the paging group level includes, stopping the increasing of the paging group level when the paging group level is the highest paging group level; and
the decreasing of the paging group level includes, stopping the decreasing of the paging group level when the paging group level is the lowest paging group level.

11. A method of managing a paging group, the method comprising:
being providing with collection paging group ID information including paging group levels and local IDs from a mobile terminal;
selecting a paging group level corresponding to a movement speed of the mobile terminal among the paging group levels;
selecting a paging group corresponding to the selected paging group level; and
transmitting information on the selected paging group to the mobile terminal 12. The method of claim 11, further comprising:
increasing the paging group level when the movement speed of the mobile terminal is high; and
decreasing the paging group level when the movement speed is low.

13. The method of claim 12, wherein:
the increasing of the paging group level includes, stopping the increasing of the paging group level when the paging group level is the highest paging group level; and
the decreasing of the paging group level includes, stopping the decreasing of the paging group level when the paging group level is the lowest paging group level.

* * * * *